(12) United States Patent
Sengupta

(10) Patent No.: US 9,058,129 B2
(45) Date of Patent: Jun. 16, 2015

(54) SYSTEM AND METHOD OF CORRELATION AND CHANGE TRACKING BETWEEN BUSINESS REQUIREMENTS, ARCHITECTURAL DESIGN, AND IMPLEMENTATION OF APPLICATIONS

(75) Inventor: Somenath Sengupta, Edison, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2275 days.

(21) Appl. No.: 11/273,674

(22) Filed: Nov. 14, 2005

(65) Prior Publication Data

US 2007/0112879 A1    May 17, 2007

(51) Int. Cl.
*G06F 9/44*    (2006.01)

(52) U.S. Cl.
CPC ........................................ *G06F 8/10* (2013.01)

(58) Field of Classification Search
USPC ................................................. 717/100, 102
See application file for complete search history.

(56) References Cited

U.S. PATENT DOCUMENTS

| | | | | |
|---|---|---|---|---|
| 5,801,958 A * | 9/1998 | Dangelo et al. | .................. | 716/18 |
| 6,654,932 B1 * | 11/2003 | Bahrs et al. | .................... | 715/210 |
| 6,963,875 B2 * | 11/2005 | Moore et al. | ........................... | 1/1 |
| 7,080,088 B1 * | 7/2006 | Lau | ........................ | 1/1 |
| 7,222,302 B2 * | 5/2007 | Hauser et al. | ................. | 715/734 |
| 7,437,358 B2 * | 10/2008 | Arrouye et al. | .................... | 707/4 |
| 7,650,592 B2 * | 1/2010 | Eckels et al. | .................. | 717/125 |
| 2003/0023953 A1 * | 1/2003 | Lucassen et al. | ............. | 717/106 |
| 2003/0135840 A1 * | 7/2003 | Szabo et al. | .................. | 717/102 |
| 2004/0133875 A1 * | 7/2004 | Kramer | ......................... | 717/101 |
| 2005/0015293 A1 * | 1/2005 | Henn et al. | ........................ | 705/9 |
| 2005/0125438 A1 * | 6/2005 | Krishnaswamy et al. | .... | 707/102 |
| 2006/0206348 A1 * | 9/2006 | Chen et al. | ........................ | 705/1 |

OTHER PUBLICATIONS

Dziri et al. (Combining architecture exploration and a path to implementation to build a complete SoC design flow from system specification to RTL, Design Automation Conference, 2003. Proceedings of the ASP-DAC 2003, p. 219-224).*

Leff et al. (Web-Application Development Using the Model/View/Controller Design Pattern, Proceedings of the 5th IEEE International Conference on Enterprise Distributed Object Computing, 2001).*

* cited by examiner

*Primary Examiner* — Hang Pan

(74) *Attorney, Agent, or Firm* — Meyer IP Law Group

(57) ABSTRACT

A system can use metadata and metadata mappings to track changes between business requirements, architectural design and implementation.

20 Claims, 6 Drawing Sheets

1. method2 of Component#3 accesses state1 and state2
2. method4 of Component#2 accesses state1 and state2

Component#1 and Component#2 are accessing the states associated with Component#3 and Component#2 in reverse order

SYSTEM AND METHOD OF CORRELATION AND CHANGE TRACKING BETWEEN BUSINESS REQUIREMENTS, ARCHITECTURAL DESIGN, AND IMPLEMENTATION OF APPLICATIONS

BACKGROUND OF INVENTION

An enterprise-level computing environment can support multiple actors, e.g. business analysts, architects, developers, and administrators. Each actor can supports a specific role in the environment, and conflicts may arise between those roles.

For example, an architect focused on ensuring that the applications within the environment adhere to strict requirements and dependencies may deviate from the original business plan. Additionally a developer or administrator updating a particular module may inadvertently jeopardize the architectural integrity of the application.

It is important to maintain the integrity of software code among the different stages of the lifecycle of an enterprise-level system, e.g. business requirements, architectural constraints, and development/administration changes.

DETAILED DESCRIPTION

Multiple actors support different roles throughout a software application lifecycle. The following provides a high-level overview of the actors and their roles in one embodiment:

1. Business analysts define the business processes and policies for an application project.
2. Architects design the software components and application interconnections based on the business requirements.
3. Developers and/or administrators write code and/or configure metadata according to the architectural specifications.

Typically, the actors work in isolation of one another, using a variety of proprietary tools. They update their work without a mechanism to correlate their changes at different phases of the application life cycle.

Figure 1:
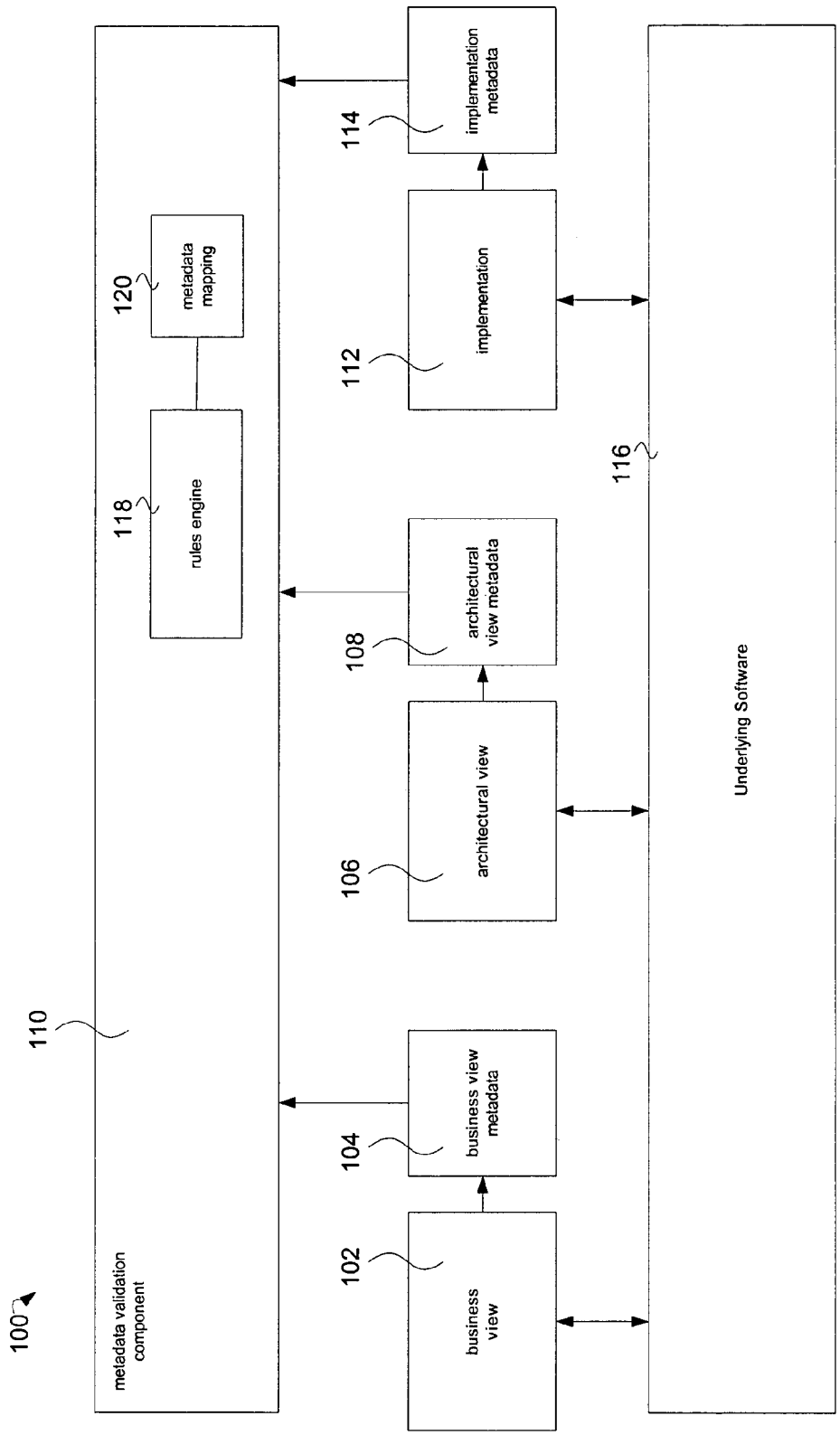
FIG. 1 is a diagram of a system of one embodiment of the present invention.

FIG. 1 shows an exemplary system of one embodiment.

The system 100 can include a business view 102 associated with business view metadata 104, an architectural view 106 associated with architectural view metadata 108, and a component 110 to validate the business view metadata with the architectural view metadata such that changes to the business view result in changes to the business view metadata that is then validated against the architectural view metadata.

The business view, architectural view, and implementation metadata can be created automatically as the corresponding views are created or modified.

The system can further include an implementation 112 associated implementation metadata 114.

The component 110 can validate the architectural view metadata with the business view metadata such that changes to the architectural view result in changes to the architectural view metadata that is then validated against the business view metadata.

One embodiment is a system comprising an architectural view associated with architectural view metadata; an implementation associated with implementation metadata; and a component to validate the architectural view metadata with the implementation metadata such that changes to the architectural view result in changes to the architectural view metadata that is then validated against the implementation metadata.

Component 110 can further validate the implementation metadata with the architectural view metadata such that changes to the implementation result in changes to the implementation metadata that is then validated against the architectural view metadata.

The business view 102, architectural view 106 and implementation 112 can be views into underlying software 116. The metadata can be constructed automatically, such as with an Integrated Development Environment (IDE) tool as the corresponding view are modified. The metadata can alternately be created manually. The metadata can be validated with a rules engine 118. The rules engine 118 can use a metadata mapping 120 to determine conflicts between the metadata.

The component 110 can be used to determine conflicts between the views. The component 110 can be used to create warnings to users when one of the views is to be changed and this would produce a conflict in the metadata. The views can be exposed by a development tool such as an IDE.

Figure 2:
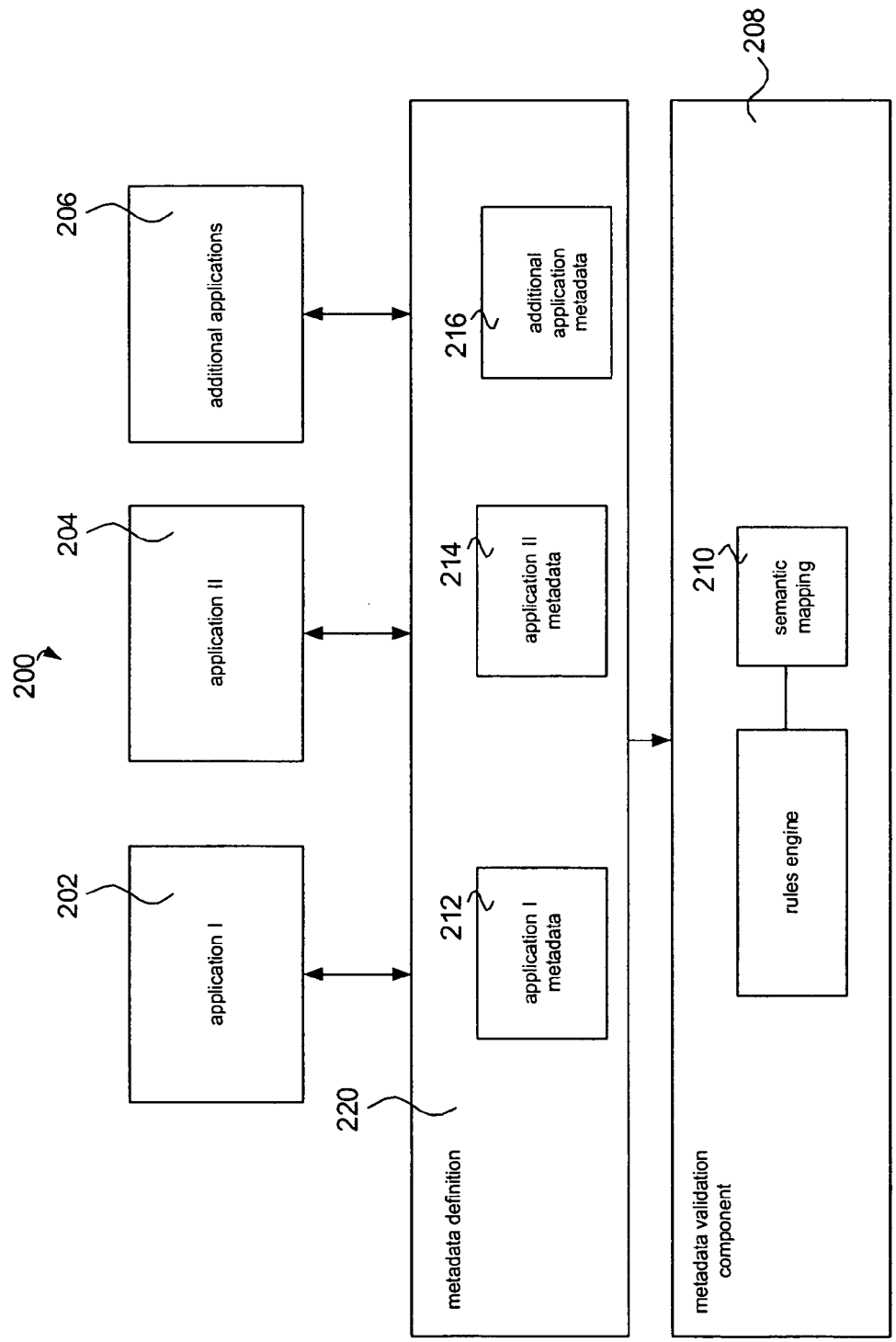
FIG. 2 is a diagram of another system of an embodiment of the present invention.

FIG. 2 shows an example of a system of one embodiment.

A system 200 can comprise multiple applications 202, 204 and 206 with associated metadata; and a component 208 using a semantic mapping 210 between metadata 212, 214 and 216 of the applications 202, 204 and 206 to check for conflicts.

The component 208 can check for deadlocks. A metadata definition 220 can be maintained for the existing applications 202, 204 and 206. The metadata definition here can indicate the associated resources and the sequences of resource access for each application Metadata for a new application can mapped against the metadata definition to detect the cyclic dependency of resources.

Actors can benefit from a tool that:
1. Correlates changes between business process and policy definition, and architectural design and implementation.
2. Provides interactive experience with multi-way editing.
3. Propagates the changes from architectural-level to business-level.
4. Ties together the business use case, architectural design, and code implementation details via a semantic validation language framework.

An exemplary two-way editing mechanism enables you to:
1. Assemble reusable modules to build composite applications.
2. Maintain multiple views of the system so actors can move back and forth between them.
3. Review the impact of a particular architectural change on the business use case.
4. Review the impact of a particular code change on the architectural design.

The business requirement can be complete and presented in a standard way. Behavior of each architectural component and its methods, which can affect the architecture, should be exposed via annotations and/or metadata. Business requirements can be mapped at the same level of granularity as the methods whose semantics are exposed as metadata.

This technique can use semantic mapping to correlate different stages of an application life cycle in an enterprise system, such as business requirement definition, logical architectural design, physical architecture/deployment, and so on. This approach can validate the end-to-end architectural consistencies in the context of security, multi-level system operation and management, and so on.

The following features can be use required to enable correlation and tracking of changes implemented by different stages of an enterprise system:

A metadata-based model generation derived from the business requirements (business view) (metadata set#1).

Logical architecture (architectural view) construction using another set of metadata (metadata set#2).

Physical architecture implementation view achieved by overlaying a metadata set (metadata set#3) that defines more details of the physical architecture on top of metadata set#2.

The metadata-driven semantic relationship can be leveraged to compute the impact of the actions. For example:

1. The architect changes the physical architecture, e.g. introduces new architectural element.
   A set of algorithms can be to re-compute the component relationship graph, reflecting the changed logical architecture of the system.
2. Business user changes the business requirement by updating the metadata set#1.
   A set of algorithms can be used to compute the impact of that change within the logical and physical architectures.

Figure 3:
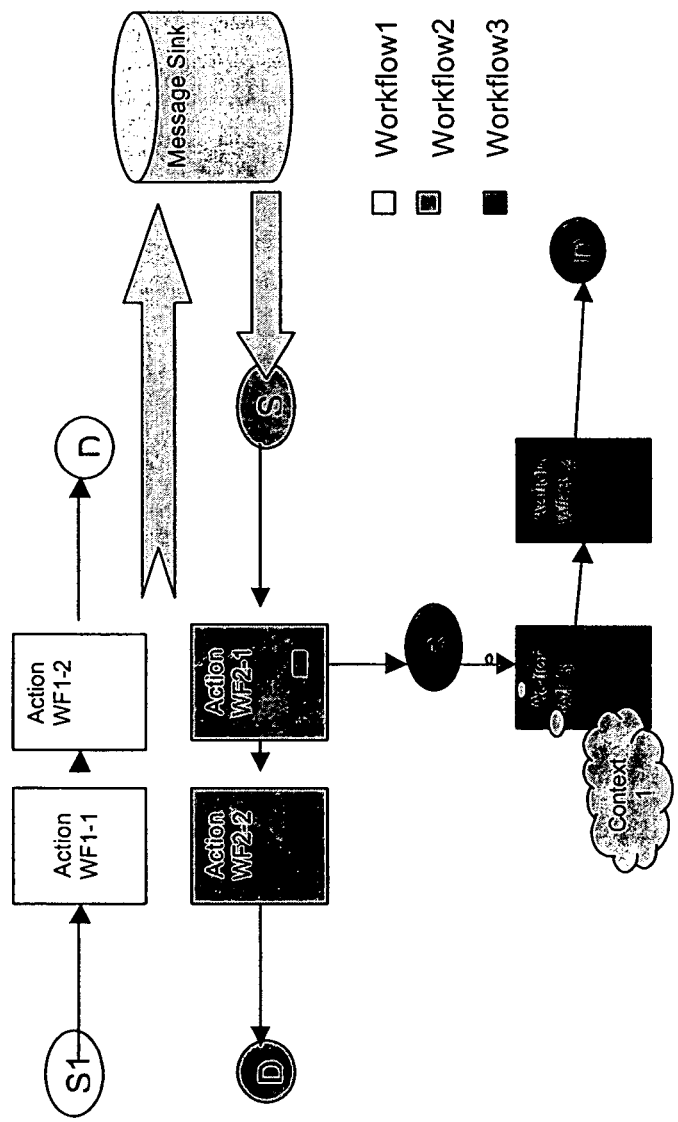
FIG. 3 is a diagram of an exemplary business definition of an enterprise-level system.

FIG. 3 presents an exemplary business definition of an enterprise-level system. The usage flow of this exemplary business definition is as follows:

1. Workflow1 is invoked via a message invocation
2. Action2 of Workflow1 sends a message called Msg-A to a message sink
3. When that message sink receives the message called Msg-A, Workflow2 gets invoked asynchronously
4. Action1 of Workflow2 invokes the sub-workflow called Workflow3 within a context called Context1. Action1 does not block execution
5. Workflow3 gets executed in Context1
6. Workflow3 and Workflow2 run parallel Example of Meta information related to business modeling based on different kinds of Workflow start nodes (Metadata Set#1)

1. Start Nodes
   a. S1
      i. Event activity
         1. Receive Message A
         2. Take Action A
   b. S2
      i. Event activity
         1. Synchronize on message sync
         2. Event Sync fires the Signal A when condition A is satisfied
   c. S3
      i. Spawning new workflow
         1. Context of the spawning
            a. Process
               i. A child process living in the context of parent process
            b. Compensation of some other actions
            c. The spawned process should be Atomic with respect to the parent process
            d. The spawned process inherits all the state Properties from the parent All the metadata described above can be presented via a semi-structural language, e.g. XML.

Figure 4:
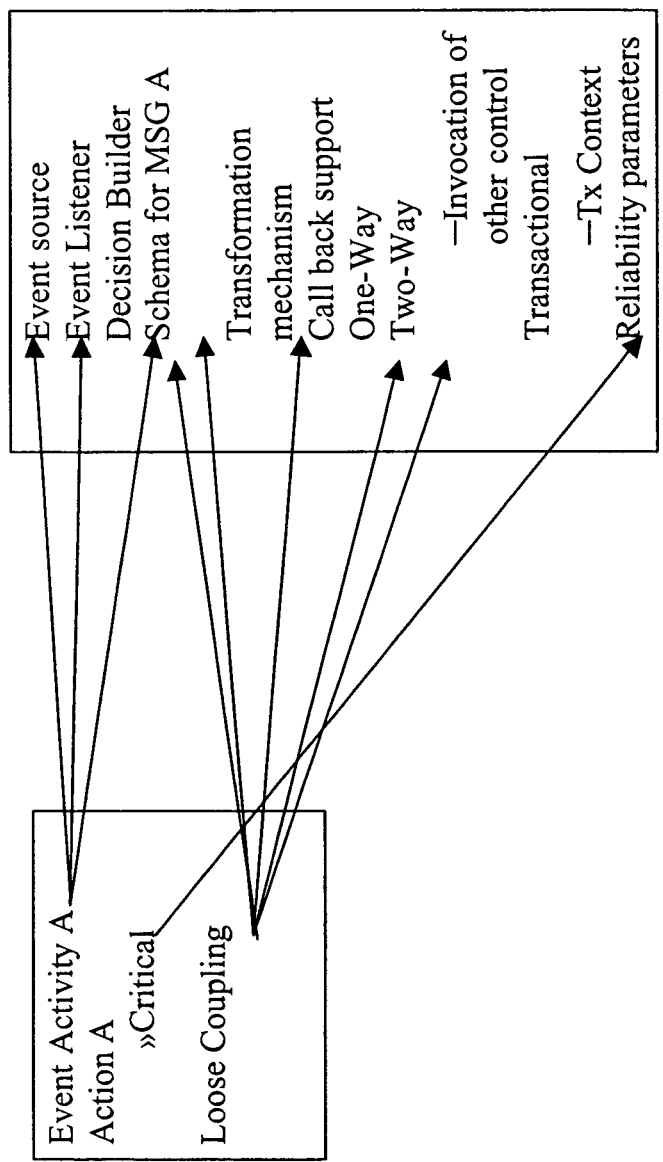
FIG. 4 is a diagram of an exemplary semantic mapping.

In the example of FIG. 4, the semantic mapping is done between the metadata set#1, defining a start node of a business workflow, to metadata set#2, defining the logical architecture of that start node. Once the mapping relationship is defined, it can be reused to correlate changes across both sets of metadata.

|  | Metadata Set#1 | Mapping logistic | Metadata Set#2 |
| --- | --- | --- | --- |
| Start Node S1 | Event Activity<br>Event A<br>Receive<br>Msg A<br>Action A<br>Critical<br>Loose Coupling | 1. Associate an event source with event A to enable event generation.<br>2. Associate an event listener to consume event A.<br>3. A Decision Builder should be associated with the start node to filter out unwanted events. Otherwise, there is no way to ensure that only the receipt of message A can start the Workflow1.<br>4. If business requires loose-coupling, start node should be associated with a transformation mechanism.<br>5. If the communication is two-way, a callback support has to be associated with Workflow1. | 1. Event source<br>2. Event Listener<br>3. Decision Builder<br>4. Transformation mechanism<br>5. Call back support<br>6. Reliability parameters |

-continued

| Metadata Set#1 | Mapping logistic | Metadata Set#2 |
|---|---|---|
| | 6. If the business process is critical to the organization, proper reliability parameters should be selected to Note: Mapping is rule-based to support dynamic changes and late bindings across two sets of metadata. This rule-based approach helps to resolve conflicts across a large set of manually generated mapping logistics. | |

As an example of impact to metadata set#1 caused by a change in metadata set #2, if any of the metadata is updated from metadata set#2, e.g. event source and event listener are deleted or replaced by a synchronous call, the persistent mapping logistic helps to detect the violation of the constraints defined by the business requirement definition e.g. meta data set#1. As an example, if an event listener is deleted, the business requirement definition (defining the message-based workflow invocation) is violated and this violation can be detected by checking the mapping information between the event listener and the corresponding workflow start node.

Figure 5:
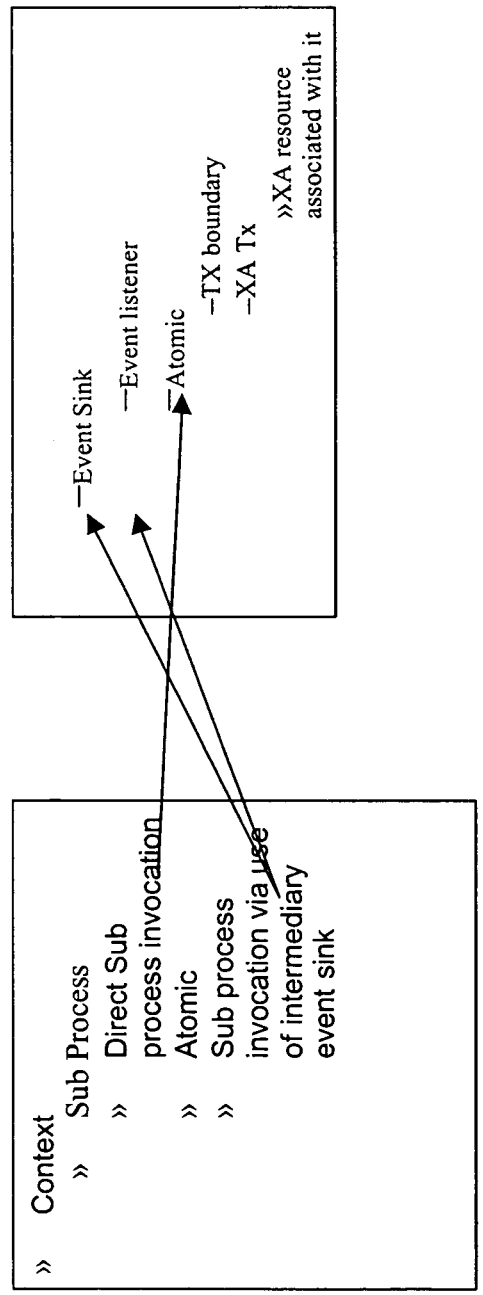
FIG. 5 is a diagram of an exemplary complex semantic mapping.

The example of FIG. 5 describes an example of complex semantic mapping, the mapping is between the metadata set#1, defining the context of a business workflow invocation, to metadata set#2, defining the logical architectural constructs building that context. Once the mapping/relationship is defined manually, it can be reused to correlate changes across both sets of metadata.

| | Metadata Set#1 | Mapping logistic | Metadata Set#2 |
|---|---|---|---|
| Context context1 | Context1 Sub Process Direct Sub process invocation Atomic Sub process invocation via use of intermediary event sink | 1. If processes within the same context synchronize over a signal, they should be connected to the same event sink. 2. Each sub-process should be associated with an event listener. 3. If a child process is created within an atomic context, it should be associated with a Tx boundary, XA resources, and so on. Notes: Any Tx demarcation associated with a child process should result in a warning, if there is a Tx associated with the parent process. Deletion of the event sink can prevent the invocation of sub processes. The persistent mapping logistic is used to detect the dependencies. Mapping is rule-based to support dynamic changes and late bindings across two sets of metadata. This rule-based approach helps to resolve conflicts across a large set of manually generated mapping logistics. | 1. Event Sink 2. Event listener 3. Atomic -TX boundary -XA Tx XA resource associated with it |

Metadata-based semantic definition can be used for architectural components to support early detection of deadlock.

Below is an example of metadata associated with architectural components to resolve architectural inconsistencies.

Metadata Set associated with architectural components
  Type: Type of the architectural component such as class/package
  Parent Element: Parent component in the context of inheritance [object-oriented paradigm]
  References to Elements: associative relationship with other architectural components
  References by Element: List of other architectural components referring to this component Public states
Private states
Concurrent-Group: Reflects the list of components that can be used concurrently
Is Persistent
    Does persistence mechanism involve:
        Blocking/non-blocking DB call
        Callback from DB
        Blocking/non-blocking Connector call
        Control members that are persistent
        Long running query
        Simple query
Access to shared resources
    Does access mechanism involve:
        Memory resource
        DB resource
        Blocking/non-blocking invocation
        Is it locked
            What kind of lock The metadata defined here can be used to create a call graph for discovering the potential deadlock in the early phase of design. The following example explains the technique in detail.

Figure 6A:
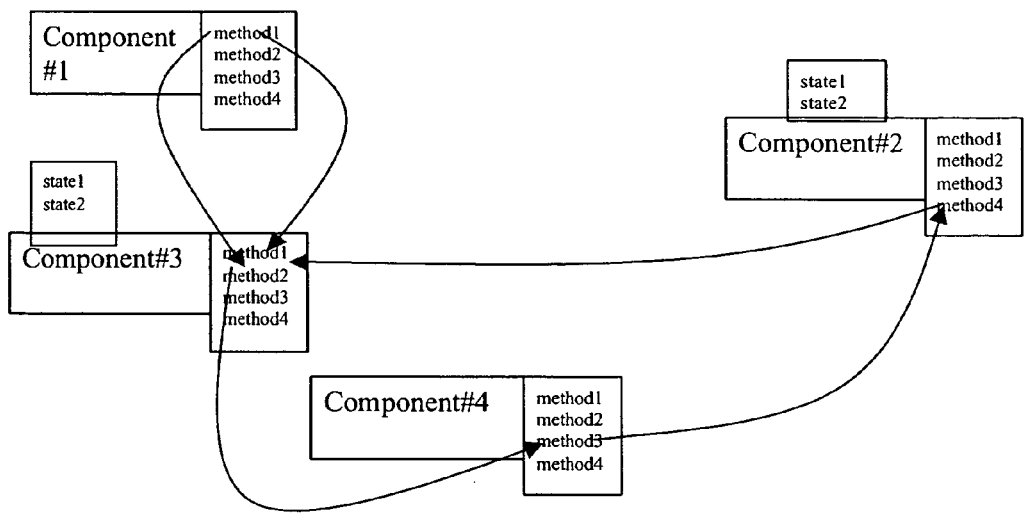
FIGS. 6A and 6B are diagrams of an exemplary "Call Sequence" across components.
Figure 6B:
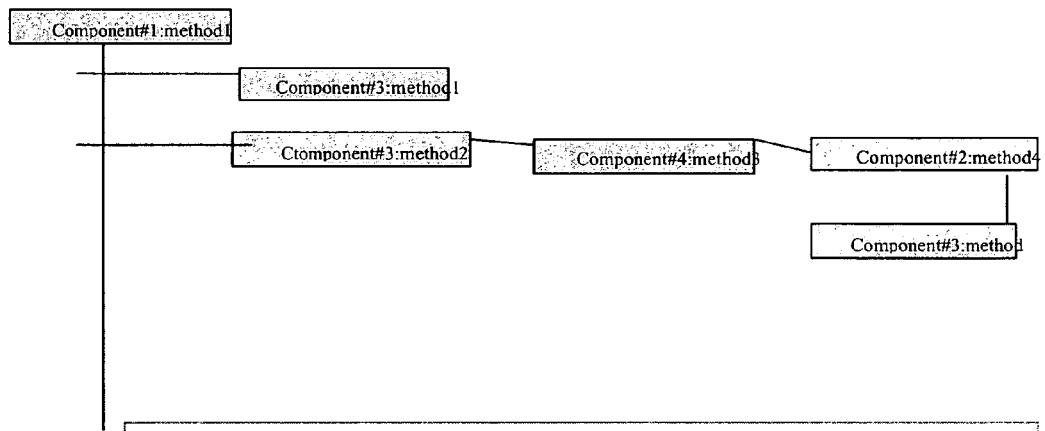

A sample "Call Sequence" across the components is presented in FIGS. 6A and 6B.

FIG. 6B represents the call stack of the calling sequence depicted in the Call Sequence diagram. This call stack is used to detect the deadlock using the following methodology:

1. Identify the methods (from various components) in a particular concurrent group.
2. For the first component in the group, make a sequential list of accessed resources (states, DB Tables).
3. Repeat the step for all the methods in the call stack.
4. Check the ordering of each of the accessed resource list to make sure there is no reverse ordering.
5. Repeat the process for other methods in the concurrent group.

On embodiment of the present invention can:
1. Use the metadata-based correlation between the business requirement definition and architectural design.
2. Use the metadata-based correlation between architectural design and implementation.
3. Track changes in business requirement definition originated from a deliberate change in architectural design.
4. Enable any application exposing their semantics via metadata to be part of a large-scale metadata definition that is referenced by multiple applications. Each application can be added iteratively to an integrated metadata definition by using semantic mapping between the metadata of cross-referenced applications.
5. Identify end-to-end architectural aspects across multiple application/service modules such as deadlock detection, end-to-end security, and so on.

The system can:
1. Provide a centralized control on the different states of a software life cycle
2. Save the cost of extensive debugging
3. Multiple actors can be accommodated to work seamlessly on different parts of the software life cycle The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scopes of the invention are defined by the claims and their equivalents.

What is claimed is:

1. A system for correlating changes across different phases of a life cycle of a software application being developed, comprising:
    a computing environment, including a microprocessor, for use by multiple actors during development of a software application, wherein the computing environment is configured to display a business view, an architectural view and a code implementation view, each view tied to the same software application and representing a different phase of the software application life cycle;
    a plurality of metadata,
        wherein each metadata is associated with a particular view, and automatically generated when that particular view is created,
        wherein when a change is made to a view of the software application, a metadata associated with the view is modified in accordance with modified relationships among components within that view, wherein the modified relationships are re-computed in response to the change using a set of algorithms, and
        wherein the change is automatically propagated to metadata associated with the other views; and
    a rules engine including a metadata mapping component, wherein the metadata mapping component includes a defined semantic mapping among the different views;
    wherein, upon determining that a metadata associated with a particular view has been modified, the rules engine uses the metadata mapping component to
        automatically validate the metadata associated with the modified view with metadata associated with the other views in accordance with a plurality of rules and the defined semantic mapping, and
        indicate any conflict between the modified view and the other views before allowing the change to be made to the metadata associated with the other views.

2. The system of claim 1, wherein the defined semantic mapping is used by the system to correlate changes across the different views; and
    wherein if a metadata associated with a view is updated by an actor, the metadata mapping component is used by the rules engine to detect any violation of the constraints defined by metadata associated with the other views.

3. The system of claim 1, wherein the software application defines a business workflow, and wherein metadata associated with the business view defines one or more start nodes of the business workflow.

4. The system of claim 1, wherein the metadata of the views are defined using one of a semi-structural language.

5. The system of claim 4, wherein the semi-structural language is extensible markup language (XML).

6. The system of claim 1, wherein each metadata indicates associated resources and sequences of access to the associated resources for the software application.

7. The system of claim 1, wherein the metadata associated with the architectural view is configured to create a graph for discovering potential deadlocks in a design phase of the software application life cycle.

8. A method for correlating changes across different phases of a life cycle of a software application being developed, comprising:

providing a computing environment, including a microprocessor, for use by multiple actors during development of a software application, wherein the computing environment is configured to display a business view, an architectural view and a code implementation view, each view tied to the same software application and representing a different phase of the software application life cycle;

providing a plurality of metadata,
    wherein each metadata is associated with a particular view, and automatically generated when that particular view is created,
    wherein when a change is made to a view of the software application, a metadata associated with the view is modified in accordance with modified relationships among components within that view, wherein the modified relationships are re-computed in response to the change using a set of algorithms, and
    wherein the change is automatically propagated to metadata associated with the other views; and providing a rules engine including a metadata mapping component, wherein the metadata mapping component includes a defined semantic mapping among the different views;

wherein, upon determining that a metadata associated with a particular view has been modified, the rules engine uses the metadata mapping component to
    automatically validate the metadata associated with the modified view with metadata associated with the other views in accordance with a plurality of rules and the defined semantic mapping, and
    indicate any conflict between the modified view and the other views before allowing the change to be made to the metadata associated with the other views.

9. The method of claim 8, wherein the defined semantic mapping is used by the system to correlate changes across the different views; and
    wherein if a metadata associated with a view is updated by an actor, the metadata mapping component is used by the rules engine to detect any violation of the constraints defined by metadata associated with the other views.

10. The method of claim 8, wherein the software application defines a business workflow, and wherein metadata associated with the business view defines one or more start nodes of the business workflow.

11. The method of claim 8, wherein the metadata of the views are defined using one of a semi-structural language.

12. The method of claim 11, wherein the semi-structural language is extensible markup language (XML).

13. The method of claim 8, where each metadata indicates associated resources and sequences of access to the associated resources for the software application.

14. The method of claim 8, wherein the metadata associated with the architectural view is configured to create a graph for discovering potential deadlocks in a design phase of the software application life cycle.

15. A non-transitory computer readable storage medium, including computer readable instructions stored thereon, which when read and executed by a computer, cause the computer to perform the steps comprising:

providing a computing environment, including a microprocessor, for use by multiple actors during development of a software application, wherein the computing environment is configured to display a business view, an architectural view and a code implementation view, each view tied to the same software application and representing a different phase of the software application life cycle;

providing a plurality of metadata,
    wherein each metadata is associated with a particular view, and automatically generated when that particular view is created,
    wherein when a change is made to a view of the software application, a metadata associated with the view is accordingly modified in accordance with modified relationships among components within that view, wherein the modified relationships are re-computed in response to the change using a set of algorithms, and
    wherein the change is automatically propagated to metadata associated with the other views; and providing a rules engine including a metadata mapping component, wherein the metadata mapping component includes a defined semantic mapping among the different views;

wherein, upon determining that a metadata associated with a particular view has been modified, the rules engine uses the metadata mapping component to
    automatically validate the metadata associated with the modified view with metadata associated with the other views in accordance with a plurality of rules and the defined semantic mapping, and
    indicate any conflict between the modified view and the other views before allowing the change to be made to the metadata associated with the other views.

16. The non-transitory computer readable storage medium of claim 15, wherein the defined semantic mapping is used by the system to correlate changes across the different views; and
    wherein if a metadata associated with a view is updated by an actor, the metadata mapping component is used by the rules engine to detect any violation of the constraints defined by metadata associated with the other views.

17. The non-transitory computer readable storage medium of claim 15, wherein the software application defines a business workflow, and wherein metadata associated with the business view defines one or more start nodes of the business workflow.

18. The non-transitory computer readable storage medium of claim 15, wherein the metadata of the views are defined using extensible markup language (XML).

19. The non-transitory computer readable storage medium of claim 15, wherein each metadata indicates associated resources and sequences of access to the associated resources for the software application.

20. The non-transitory computer readable storage medium of claim 15, wherein the metadata associated with the architectural view is configured to create a graph for discovering potential deadlocks in a design phase of the software application life cycle.

* * * * *

UNITED STATES PATENT AND TRADEMARK OFFICE
CERTIFICATE OF CORRECTION

| | | |
|---|---|---|
| PATENT NO. | : 9,058,129 B2 | Page 1 of 1 |
| APPLICATION NO. | : 11/273674 | |
| DATED | : June 16, 2015 | |
| INVENTOR(S) | : Sengupta | |

It is certified that error appears in the above-identified patent and that said Letters Patent is hereby corrected as shown below:

In the Specification

In columns 5-6, line 7, delete "should be selected to" and insert -- should be selected to avoid a Warning. --, therefor.

Signed and Sealed this
Twelfth Day of April, 2016

Michelle K. Lee
*Director of the United States Patent and Trademark Office*